(12) United States Patent
Kremkow et al.

(10) Patent No.: US 10,974,650 B2
(45) Date of Patent: Apr. 13, 2021

(54) REARVIEW DEVICE MOUNT AND ATTACHMENT METHOD

(71) Applicant: Gentex Corporation, Zeeland, MI (US)

(72) Inventors: Andrew J. Kremkow, Holland, MI (US); Andreas Kraus, Baden-Wurttemberg (DE); Blake R. Adams, Comstock Park, MI (US); Sebastien C. Jaeger, Saugatuck, MI (US); Alexander K. Stapf, Neckarsulm (DE); Jeremy J. Samora, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 35 days.

(21) Appl. No.: 16/213,676

(22) Filed: Dec. 7, 2018

(65) Prior Publication Data

US 2019/0176701 A1 Jun. 13, 2019

Related U.S. Application Data

(60) Provisional application No. 62/597,244, filed on Dec. 11, 2017.

(51) Int. Cl.
*B60R 1/04* (2006.01)
*B60R 1/12* (2006.01)

(52) U.S. Cl.
CPC .................. *B60R 1/04* (2013.01); *B60R 1/12* (2013.01); *B60R 2001/1253* (2013.01)

(58) Field of Classification Search
USPC .... 248/466, 475.1, 476, 477, 488, 489, 490, 248/495; 359/871, 872, 879, 880
See application file for complete search history.

(56) References Cited

U.S. PATENT DOCUMENTS

| | | |
|---|---|---|
| 596,207 A | 12/1897 | Hart |
| 892,105 A | 6/1908 | White |
| 1,800,797 A | 4/1931 | Hoople |
| 4,254,931 A | 3/1981 | Aikens et al. |
| 4,435,042 A | 3/1984 | Wood et al. |
| 5,058,851 A | 10/1991 | Lawlor et al. |
| 5,100,095 A | 3/1992 | Haan et al. |
| 5,106,177 A | 4/1992 | Dolasia |
| 5,377,948 A | 1/1995 | Suman et al. |
| 5,377,949 A | 1/1995 | Haan et al. |
| 5,487,522 A | 1/1996 | Hook |
| 5,588,767 A | 12/1996 | Merlo |

(Continued)

FOREIGN PATENT DOCUMENTS

| | | |
|---|---|---|
| EP | 0169734 B1 | 10/1989 |
| JP | 2004082829 A | 3/2004 |

(Continued)

*Primary Examiner* — Alfred J Wujciak
(74) *Attorney, Agent, or Firm* — Price Heneveld LLP; Bradley D. Johnson

(57) ABSTRACT

A rearview assembly includes a rearview device having at least one of a display and an electro-optic element. A mount is pivotally coupled with the rearview device. The mount includes a receiving aperture for receiving an installation tool. A mounting button is operably coupled with a vehicle and is configured to engage the mount, wherein during installation, the installation tool is used to rotate the mount into engagement with the mounting button.

8 Claims, 5 Drawing Sheets

(56) References Cited

U.S. PATENT DOCUMENTS

| | | |
|---|---|---|
| 5,615,857 A | 4/1997 | Hook |
| 5,820,097 A | 10/1998 | Spooner |
| 5,931,440 A * | 8/1999 | Miller .................. B60R 1/04 248/549 |
| 6,250,148 B1 * | 6/2001 | Lynam .................. B60R 1/04 73/170.17 |
| 6,299,319 B1 | 10/2001 | Mertens et al. |
| 6,326,613 B1 | 12/2001 | Heslin et al. |
| 6,326,900 B2 | 12/2001 | DeLine et al. |
| 6,341,523 B2 | 1/2002 | Lynam |
| 6,447,127 B1 | 9/2002 | Yoshida et al. |
| 6,467,919 B1 | 10/2002 | Rumsey et al. |
| 6,483,438 B2 | 11/2002 | DeLine et al. |
| 6,516,664 B2 | 2/2003 | Lynam |
| 6,843,575 B2 | 1/2005 | Wachi |
| 6,877,709 B2 | 4/2005 | March et al. |
| 6,968,736 B2 | 11/2005 | Lynam |
| 7,025,315 B2 | 4/2006 | Carnevali |
| 7,156,358 B2 | 1/2007 | March et al. |
| 7,287,868 B2 | 10/2007 | Carter et al. |
| 7,296,771 B2 | 11/2007 | Kalis et al. |
| 7,717,394 B2 | 5/2010 | Tanaka et al. |
| 7,726,623 B2 | 6/2010 | Müller |
| 8,134,117 B2 | 3/2012 | Heslin et al. |
| 8,210,695 B2 | 7/2012 | Roth et al. |
| 8,226,064 B2 | 7/2012 | Ohashi |
| 8,309,907 B2 | 11/2012 | Heslin et al. |
| 8,456,311 B2 | 6/2013 | Wohlfahrt et al. |
| 8,925,891 B2 * | 1/2015 | Van Huis .................. B60R 1/04 248/475.1 |
| 8,944,705 B1 | 2/2015 | Matori |
| 8,960,629 B2 * | 2/2015 | Rizk .................. B60R 1/04 248/481 |
| 9,174,577 B2 * | 11/2015 | Busscher ................ F16B 2/241 |
| 9,244,249 B2 * | 1/2016 | Kim .................. B60R 1/12 |
| 9,573,525 B2 | 2/2017 | Minikey, Jr. et al. |
| 9,682,656 B2 | 6/2017 | Busscher et al. |
| 10,190,610 B1 * | 1/2019 | Busscher ................ F16B 5/125 |
| 2003/0169522 A1 * | 9/2003 | Schofield ........... H04N 5/23238 359/876 |
| 2004/0207940 A1 | 10/2004 | Carter et al. |
| 2005/0174663 A1 | 8/2005 | Carter et al. |
| 2007/0096005 A1 | 5/2007 | March et al. |
| 2011/0168866 A9 | 7/2011 | Gruener et al. |
| 2013/0062497 A1 * | 3/2013 | Van Huis .................. B60R 1/04 248/479 |
| 2014/0055617 A1 * | 2/2014 | Minikey, Jr. ............. B60R 11/00 348/148 |
| 2014/0063630 A1 * | 3/2014 | Busscher .................. B60R 1/04 359/871 |
| 2015/0224928 A1 | 8/2015 | Busscher et al. |
| 2016/0016518 A1 * | 1/2016 | Jeon .................. B60R 1/04 359/881 |
| 2016/0031503 A1 * | 2/2016 | Rawlings ............... G02B 7/182 29/426.2 |
| 2019/0126850 A1 * | 5/2019 | Hallack ................ B60R 11/04 |
| 2019/0176705 A1 * | 6/2019 | DeMaagd ................ F16B 1/00 |

FOREIGN PATENT DOCUMENTS

| | | |
|---|---|---|
| JP | 2007112206 A | 5/2007 |
| RU | 2083393 C1 | 7/1997 |
| SU | 1341081 A1 | 9/1987 |

* cited by examiner

REARVIEW DEVICE MOUNT AND ATTACHMENT METHOD

CROSS-REFERENCE TO RELATED APPLICATION

This application claims priority to and the benefit under 35 U.S.C. § 119(e) of U.S. Provisional Application No. 62/597,244, filed on Dec. 11, 2017, entitled "ROTATION MOUNT ATTACHMENT METHOD," the disclosure of which is hereby incorporated herein by reference in its entirety.

FIELD OF THE DISCLOSURE

The present disclosure generally relates to a rearview device, and more particularly to a mount attachment method for a rearview device.

SUMMARY OF THE DISCLOSURE

According to one aspect of the present disclosure, a method of installing a rearview assembly includes coupling a mounting button to one of a vehicle windscreen and a vehicle headliner. A mount is positioned adjacent to the mounting button. Engagement arms of a spring clip of the mount are adjacent to engagement surfaces of the mounting button. A tool is inserted into a receiving aperture extending into the mount. A force is applied to the tool that rotates the engagement arms of the spring clip into secure engagement with the engagement surfaces of the mounting button, thereby securing the mount to the mounting button.

According to another aspect of the present disclosure, a rearview assembly includes a rearview device having at least one of a display and an electro-optic element. A mount is pivotally coupled with the rearview device. The mount includes a receiving aperture for receiving an installation tool. A spring clip is removably coupled to the mount. The spring clip includes engagement arms. A mounting button is operably coupled with a vehicle and is configured to engage the engagement arms of the mount. During installation, the installation tool is used to rotate the engagement arms of the mount into engagement with engagement surfaces of the mounting button.

According to yet another aspect of the present disclosure, a rearview assembly includes a rearview device having at least one of a display and an electro-optic element. A mount is pivotally coupled with the rearview device. The mount includes a receiving aperture for receiving an installation tool. A mounting button is operably coupled with a vehicle and is configured to engage the mount, wherein during installation, the installation tool is used to rotate the mount into engagement with the mounting button.

According to another aspect of the present disclosure, a method of installing a rearview assembly includes coupling a mounting button to one of a vehicle windscreen and a vehicle headliner. A mount is aligned with and positioned adjacent to the mounting button such that engagement arms of a spring clip of the mount are adjacent to engagement surfaces of the mounting button. A tool is inserted into a receiving aperture extending into the mount and a rotational force is applied to the tool. The tool rotates the mount and engagement arms of the spring clip into secure engagement with the engagement surfaces of the mounting button, thereby securing the mount to the mounting button.

These and other features, advantages, and objects of the present disclosure will be further understood and appreciated by those skilled in the art by reference to the following specification, claims, and appended drawings.

DETAILED DESCRIPTION

Figure 1:
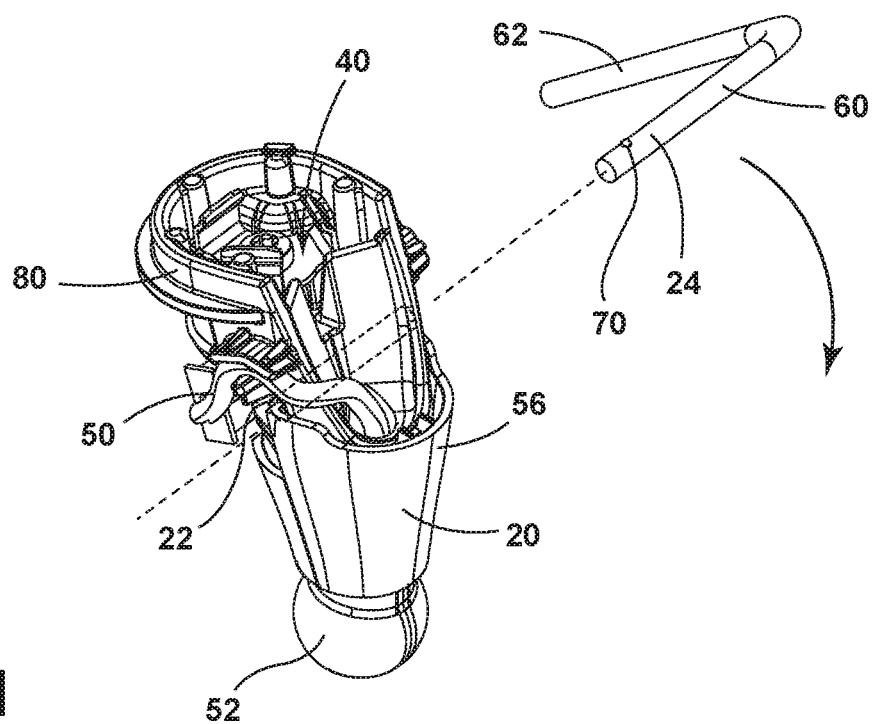
FIG. 1 is a first side perspective view of a mount prior to engagement with a mounting button of the present disclosure.
Figure 2:
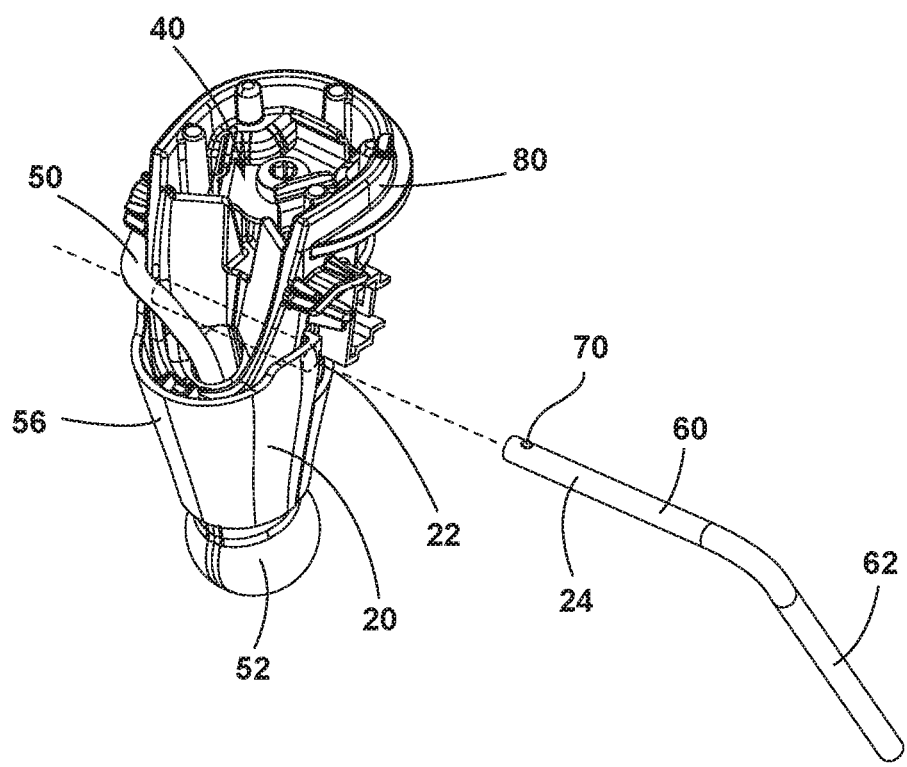
FIG. 2 is a second side perspective view of the mount of FIG. 1.

The present illustrated embodiments reside primarily in combinations of method steps and apparatus components related to a mounting button. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-6, reference numeral 10 generally designates a rearview assembly that includes a rearview device 12 having at least one of a display 14 and an electro-optic element 16. A mount 20 is pivotally coupled with the rearview device 12. The mount 20 defines a receiving aperture 22 for receiving an installation tool 24. A mounting button 26 is operably coupled with a vehicle 30 and is configured to engage the mount 20, wherein during installation, the installation tool 24 is used to rotate the mount 20 into engagement with the mounting button 26.

With reference again to FIGS. 1-6, the receiving aperture 22 of the mount 20 is generally configured to receive the installation tool 24 to assist in installation of the mount 20 within the vehicle 30. The mount 20 includes a spring clip 40 having a mechanical fastener 42 configured to engage a receiving boss 44 within the mount 20. The spring clip 40 includes a plurality of engagement arms 46 configured to engage engagement surfaces 48 of the mounting button 26. The mount 20 includes a power and/or data plug 50 configured to relay power adjacent to or through a ball 52 of the mount 20. The power and/or data plug 50 may be operably coupled with an exterior portion of the mount 20 or an interior portion of the mount 20. In addition, the mount 20 includes first and second casing members 54, 56 configured to conceal or shroud at least a portion of the mount 20. In the illustrated embodiment shown in FIG. 5, the first and second casing members 54, 56 extend about a body portion 58 of the mount 20, and may be configured to cover the body portion 58, as well as the power and/or data plug 50.

With reference again to FIGS. 1 and 2, the receiving aperture 22 is illustrated as extending through the body portion 58 of the mount 20 directly below the spring clip 40. However, it will be understood that the receiving aperture 22 may extend only partially into the mount 20. Additionally, it will be understood that the receiving aperture 22 may extend into the mount 20 at various angles and at various heights relative to the body portion 58 of the mount 20. For example, the receiving aperture 22 may extend in a direction orthogonally to that shown in FIG. 1 such that the installation tool 24 would also extend orthogonally into the mount 20. It is generally contemplated that the receiving aperture 22 will be positioned at an angle and at a height relative to the mount 20 that facilitates easy rotation of the mount 20 during installation of the mount 20 onto the mounting button 26 without putting undue stress or torque on the installation tool 24 or the body portion 58 of the mount 20.

With reference again to FIGS. 1 and 2, the installation tool 24 may take on a variety of shapes and configurations. For example, as illustrated, the installation tool 24 includes an insertion member 60 configured to engage the receiving aperture 22 and a handle portion 62 that extends at a right angle relative to the insertion member 60. It will be understood that the handle portion 62 may extend at a variety of angles relative to the insertion member 60. Moreover, the handle portion 62 may extend from the insertion member 60 to generally define an L-shaped installation tool, or may be shaped to define a T-shaped construction, or other various configurations. Moreover, the handle portion 62 may include a diameter similar to that of the insertion member 60 (FIG. 3) or may have a knurled grip, or a larger diameter than the insertion member 60, possibly with finger grooves 68 (FIG. 4). The larger grip or knurled portion may be configured to better suit the hand of an installer during rotation of the mount 20 relative to the mounting button 26. In addition, the installation tool 24 may include a locking feature 70 that is configured to secure the insertion member 60 within the receiving aperture 22. In this instance, the locking feature 70 facilitates secure engagement of the insertion member 60 within the receiving aperture 22. Consequently, the chance of an installer slipping and withdrawing the handle, and potentially risking injury to the installer or damage to the vehicle, is minimized. The locking feature 70 may lock within the mount 20 or lock once the insertion member 60 has been inserted to a point where the locking feature 70 has extended all the way through the mount 20. The locking feature 70 may be a frictional detent locking mechanism, etc., that prohibits or at least deters removal of the insertion member 60 of the installation tool 24 from the receiving aperture 22. The installation tool 24 may be constructed from a metallic material, or a plastic material that has sufficient rigidity to allow for a substantial torque load to be placed on the installation tool 24 without breaking or bending the installation tool 24 during installation of the mount 20 onto the mounting button 26.

Figure 3:
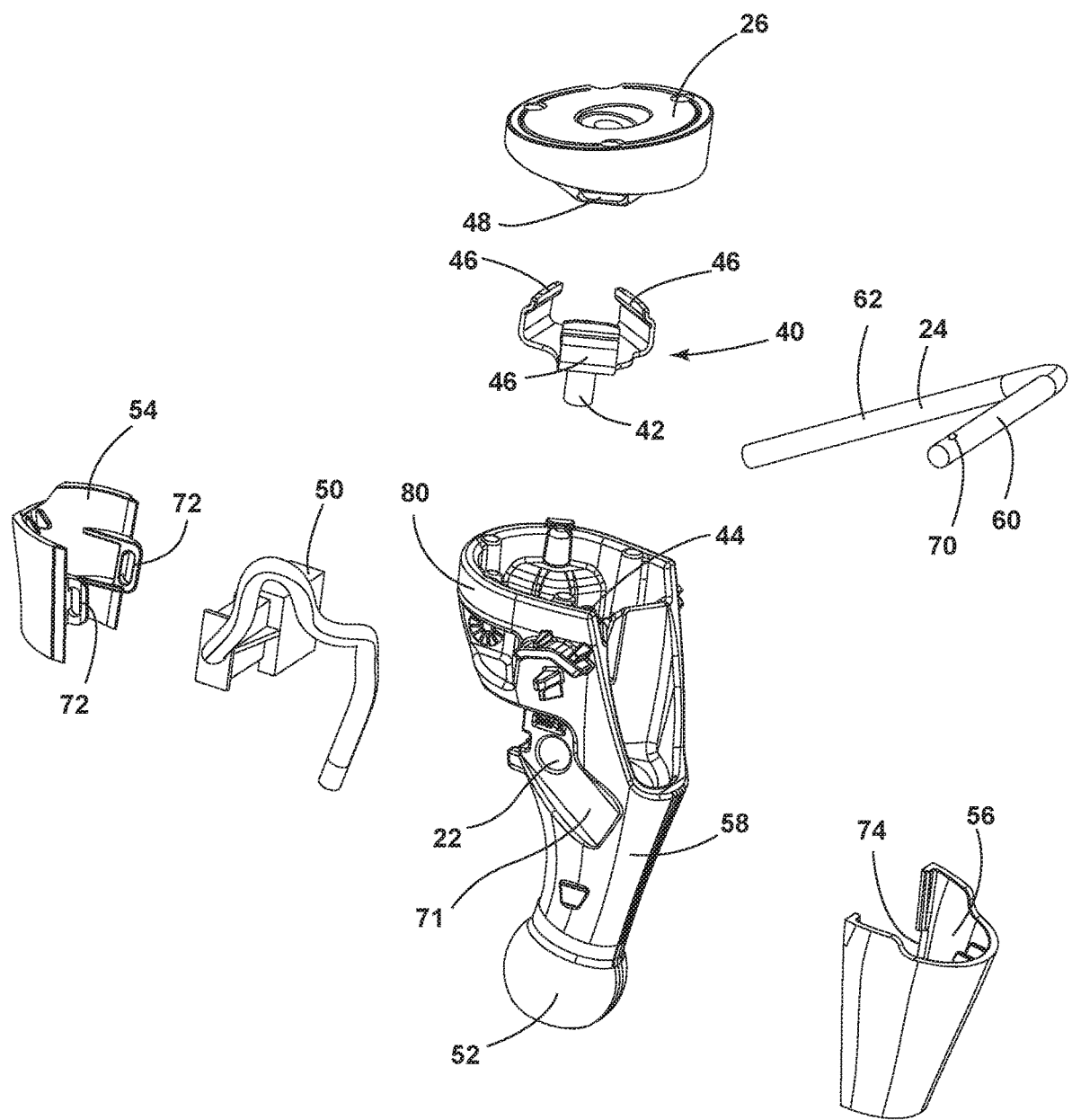
FIG. 3 is an exploded top perspective view of a mounting assembly of the present disclosure.
Figure 4:
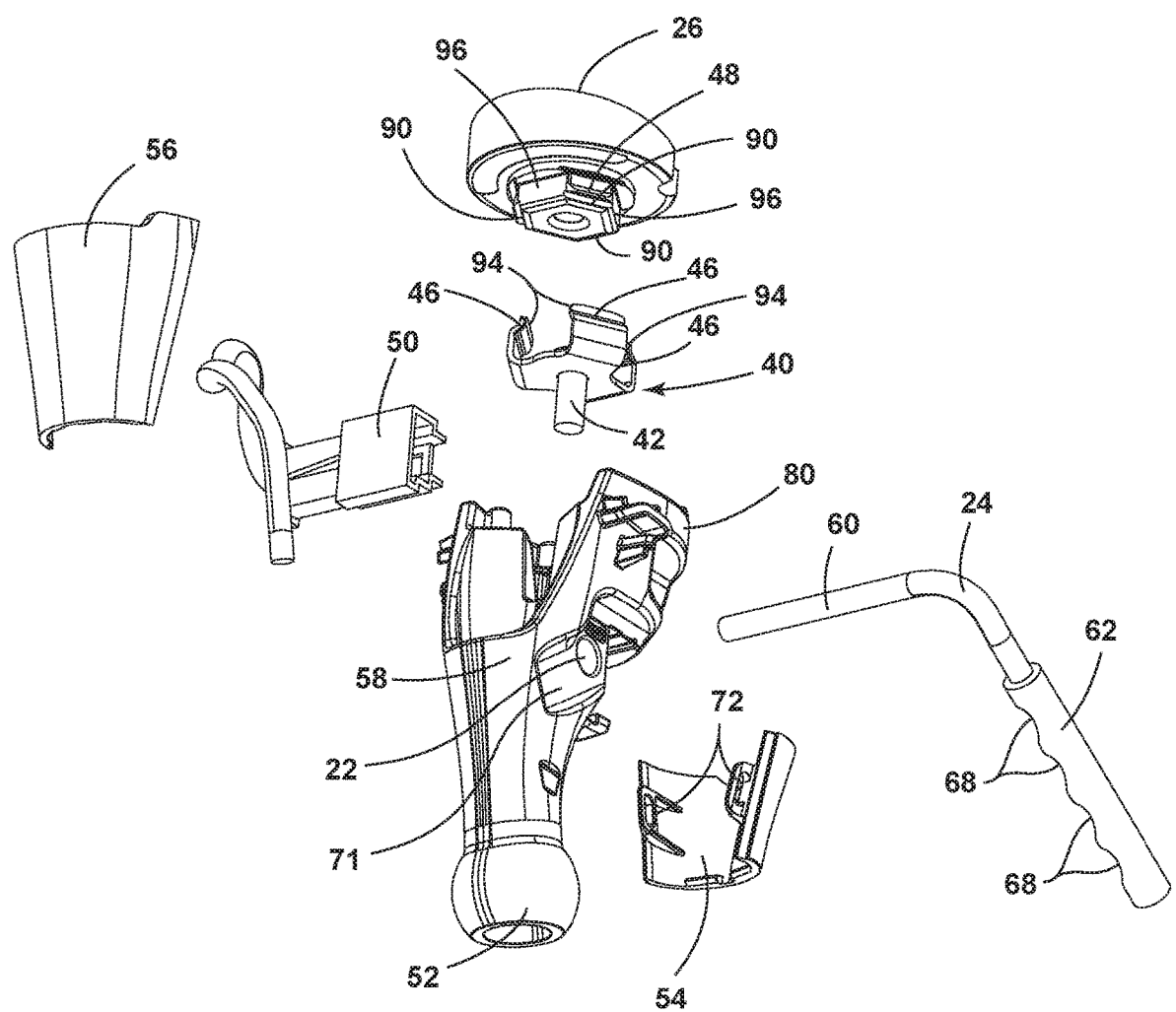
FIG. 4 is an exploded bottom perspective view of a mounting assembly of the present disclosure.

With reference now to FIGS. 2-5, it will be understood that the receiving aperture 22 may extend through one of both of the first and second casing members 54, 56 or be exposed even after installation of the first and second casing members 54, 56. Alternatively, the receiving aperture may extend only through the body portion 58 of the mount 20 and be generally concealed by one of or both of the first and second casing members 54, 56. As shown in FIGS. 3 and 4, the receiving aperture 22 may be positioned adjacent to or within a recess 71. Further, the first casing member 54 may include attachment features 72 configured to engage the mount 20 or complementary mounting features 74 of the second casing member 56. In either instance, both the first casing member 54 and the second casing member 56 may be configured for secure engagement with the mount 20 prior to or after the mount 20 is fully engaged with the mounting button 26.

With reference again to FIGS. 3 and 4, an upper shroud portion 80 is generally configured to receive the spring clip 40. The upper shroud portion 80 may be integral with or separate from the mount 20. The upper shroud portion 80 is also configured to receive a portion of the mounting button 26. As illustrated herein, the spring clip 40 includes three engagement arms 46 configured to engage three lobes 90 extending from the mounting button 26. However, it will be understood that the spring clip 40 may include more than or less than three engagement arms 46. Likewise, the mounting button 26 may include more than or less than three lobes 90 that extend downwardly from the mounting button 26. In many instances, the number of engagement arms 46 of the spring clip 40 will be consistent with the number of lobes 90 that extends from the mounting button 26. Each lobe 90 defines one engagement surface 48 that interfaces with inwardly extending ends 94 of the engagement arms 46. An insertion space 96 is disposed between each lobe 90 and engagement surface 48.

Figure 5:
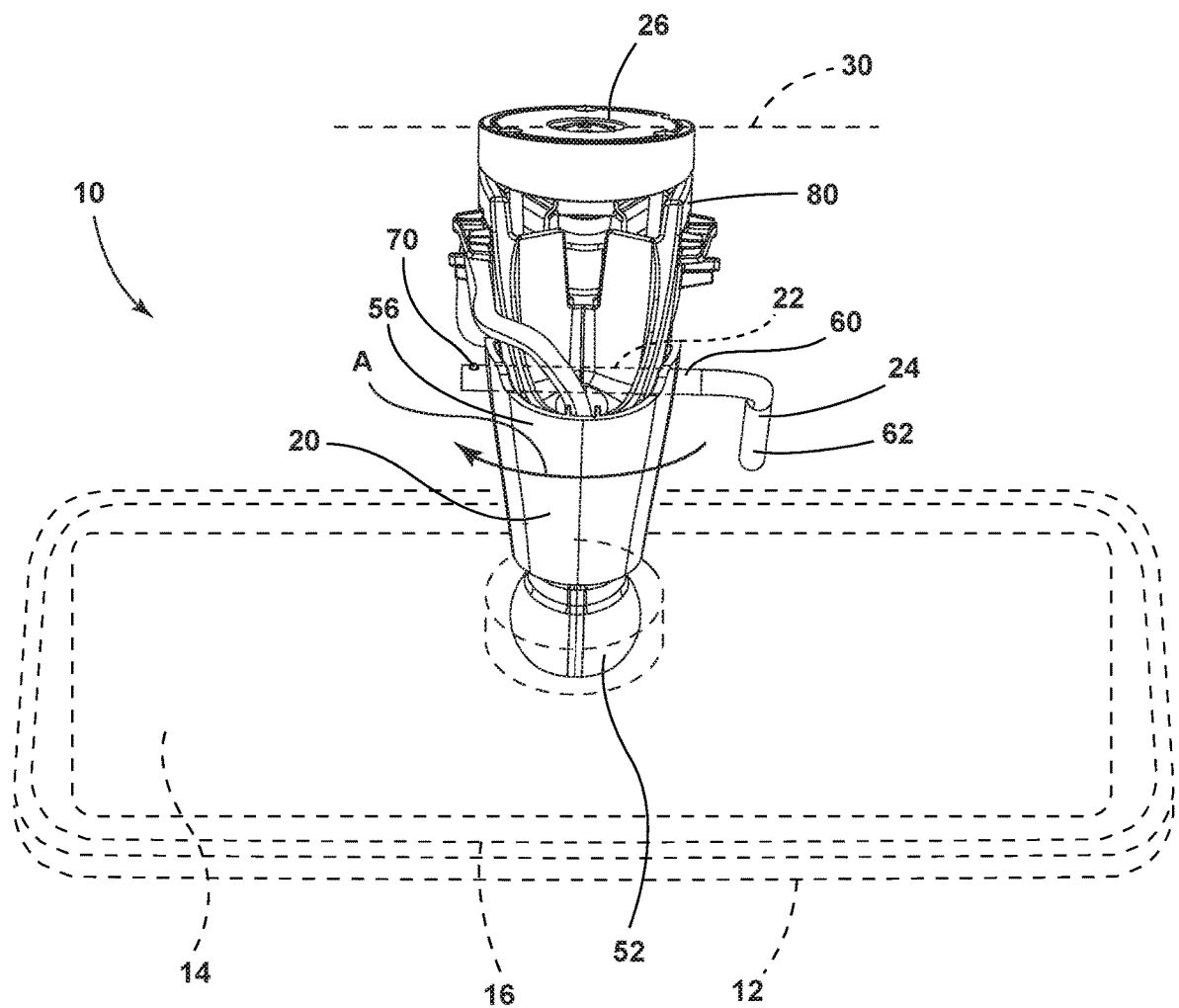
FIG. 5 is a front perspective view of a mounting button prior to installation on a rearview assembly.
Figure 6:
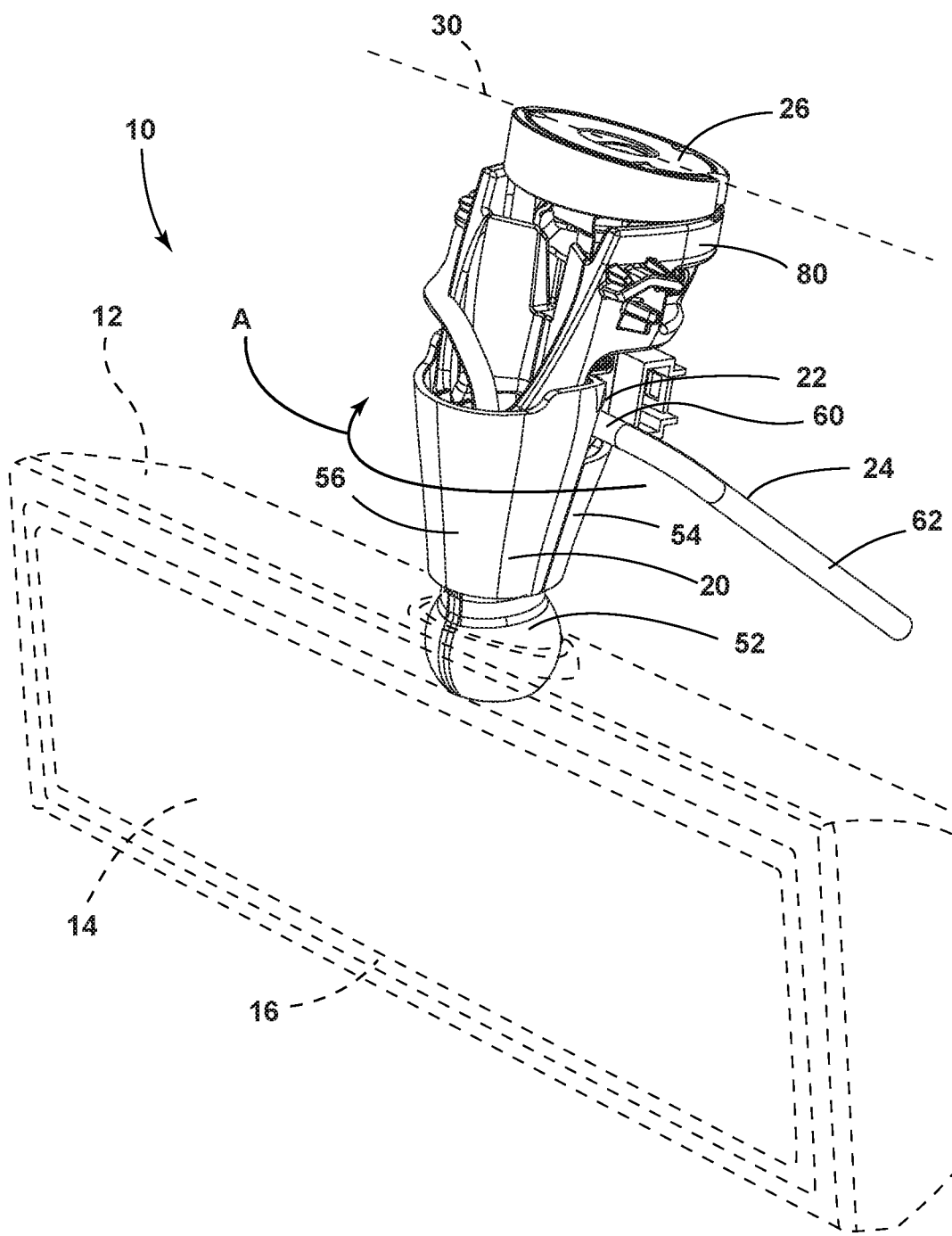
FIG. 6 is a top perspective view of the mounting button of FIG. 3 after installation on a rearview assembly.

With reference now to FIGS. 5 and 6, during installation, the mounting button 26 is installed by attaching the mounting button 26 to a windscreen or a headliner of the vehicle 30. However, it will be understood that the mounting button 26 may be positioned at other areas within the vehicle 30. The insertion member 60 of the installation tool 24 is inserted into the receiving aperture 22. The mount 20 is then aligned with the mounting button 26 so that engagement arms 46 of the spring clip 40 are adjacent to the engagement surfaces 48 of the mounting button 26. More specifically, the inwardly extending ends 94 of the engagement arms 46 are inserted into the insertion space 96. Utilizing the improved leverage of the installation tool 24, the mount 20 is then rotated in the direction of arrow A against the mounting button 26 so that the engagement arms 46 of the spring clip 40 frictionally engage the engagement surfaces 48 of the mounting button 26. It is generally contemplated that the mount 20 may be rotated anywhere from 5 degrees to 160 degrees. In the illustrated embodiment, the mount 20 is rotated approximately 60 degrees. Once in position, the installation tool 24 may be withdrawn from the receiving aperture 22 defined by the mount 20 and used for installation of other mounts 20 to other mounting buttons 26 in other vehicles 30.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly for a vehicle windscreen or a vehicle headliner, comprising:
    a rearview device including at least one of a display and an electro-optic element;
    a mount pivotally coupled with the rearview device, wherein the mount includes a receiving aperture for receiving a removable installation tool;
    a spring clip removably coupled to the mount and including engagement arms;
    a mounting button operably coupled with said vehicle windscreen or said vehicle headliner and configured to engage the engagement arms of the spring clip, wherein during installation, the removable installation tool is used to rotate the mount, which in turn rotates the engagement arms of the spring clip into engagement with engagement surfaces of the mounting button.

2. The rearview assembly of claim 1, wherein the receiving aperture extends through a body portion of the mount.

3. The rearview assembly of claim 2, wherein the receiving aperture extends through the body portion of the mount directly below the spring clip.

4. The rearview assembly of claim 1, wherein the mount includes first and second casing members configured to conceal at least a portion of the mount.

5. The rearview assembly of claim 4, wherein the receiving aperture is concealed by at least one of the first and second casing members.

6. The rearview assembly of claim 1, wherein the removable installation tool includes a handle portion and an insertion member that together define an L-shaped installation tool.

7. The rearview assembly of claim 6, wherein the removable installation tool includes a locking feature configured to secure the insertion member within the receiving aperture.

8. The rearview assembly of claim 7, wherein the locking feature locks within the mount.

* * * * *